UNITED STATES PATENT OFFICE.

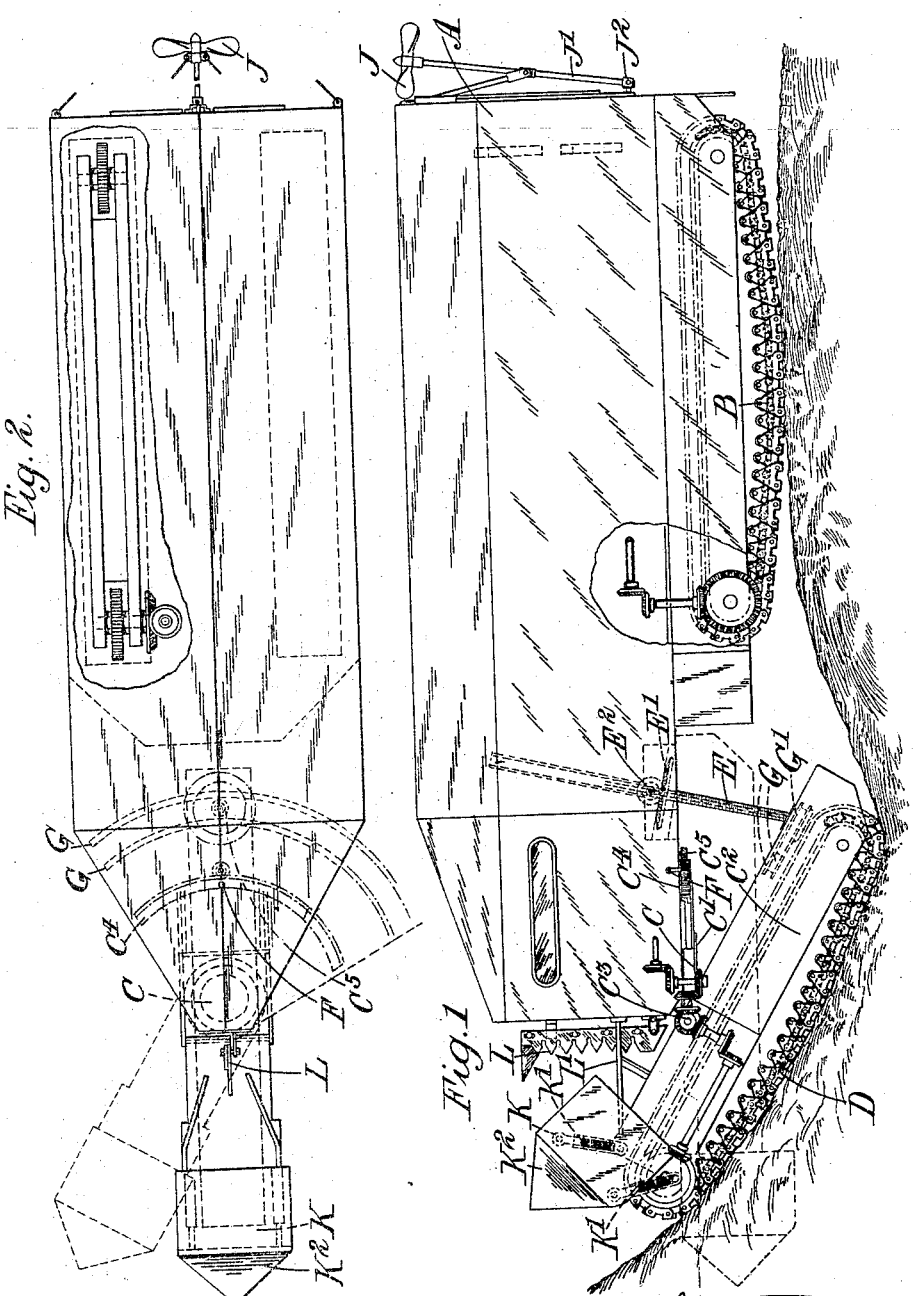

ROBERT FRANCIS MACFIE, OF LONDON, ENGLAND.

MOTOR-VEHICLE.

1,298,366.

Specification of Letters Patent.

Patented Mar. 25, 1919.

Application filed September 4, 1917. Serial No. 189,654.

*To all whom it may concern:*

Be it known that I, ROBERT FRANCIS MACFIE, a citizen of the United States of America, residing in London, England, have invented certain new and useful Improvements in Motor-Vehicles, of which the following is a specification.

This invention relates to vehicles of the type which have an endless portable track or tracks, such as a chain-tread, and are propelled by an internal-combustion engine or other motor driving wheels around which the portable track passes. These vehicles are intended to travel over rough ground which is impassable to the ordinary type of wheeled motor-vehicle, and it is the object of the present invention to provide an improved form of the above type of vehicle which has a wider range of capabilities and is moreover capable of floating so that even water or rivers do not impede it. The improved vehicle is particularly suitable for use as an armored car in warfare.

According to this invention the frame carrying the portable track or tracks is adjustable about a horizontal axis relatively to the body so that it can be tilted to bring it into contact with the ground when it might otherwise be unable to reach it, or to give a large gripping surface when climbing on to a steep bank.

The invention is preferably applied to a vehicle of the type in which the body is pivotally mounted upon a bogie carrying the portable track or tracks, and on separate supporting means such as wheels, the bogie being arranged to turn relatively to the body to effect steering, and in this construction the whole bogie is made to swing about a horizontal axis.

According to another feature of the invention, the lower part of the body of the vehicle is made water-tight and of such buoyancy that the whole vehicle can float in water, and a propeller is provided, with means for operatively connecting it to the engine to drive the vehicle when afloat.

Other features of the invention are hereinafter described and the novel details pointed out in the claims; the description refers to a particular construction of vehicle which is illustrated in the accompanying drawings, wherein—

Figure 1 is a side elevation of the vehicle with some parts broken away to show various details;

Fig. 2 is a plan of Fig. 1;

Like reference characters indicate like parts throughout the drawings.

Figure 3:
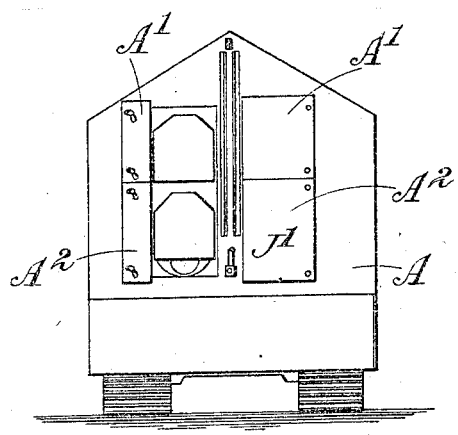
Fig. 3 is an end elevation looking from the right-hand end of Fig. 1.

In the drawings, which illustrate an armored vehicle suitable for military purposes, the body A, of suitable dimensions and shape, is constructed of bullet-proof or other suitable armoring material. Preferably it is completely covered by an armored roof and the usual small openings are provided in the walls for observation purposes and for permitting the use of fire-arms or guns from the interior of the vehicle. At the rear end, that is to say the right-hand end in Figs. 1 and 2, the vehicle is supported by a pair of portable endless tracks B, arranged one at each side of the vehicle. The engine, or engines, for propelling the vehicle are preferably of the internal-combustion type and are situated toward the rear end of the vehicle in the interior thereof and the drive is transmitted to the tracks through any convenient arrangement of gearing.

The front end of the vehicle is supported by a bogie having a vertical pivotal mounting at C which permits the bogie to turn about a vertical axis relatively to the body. Any convenient construction of mounting may be used whereby a frame-member $C^1$ can turn relatively to the body, and preferably the pivotal axis is arranged close to the front end of the body. The other part of the bogie, indicated at $C^2$, is connected to the part $C^1$ by a horizontal pivot-connection at $C^3$, so that the part $C^2$ can swing downward relatively to the part $C^1$ as indicated in Fig. 1.

A curved rack or quadrant $C^4$ is provided on the member $C^1$ and a pinion $C^5$, mounted on the body of the vehicle, meshes with the rack. This pinion provides the means for turning the bogie relatively to the body to effect the steering of the vehicle.

The bogie $C^2$ is provided with an endless portable track D similar to the tracks B, and this track is arranged to be driven from the engine or one of the engines carried by the vehicle. The transmission gearing is arranged so that some of the elements of it are concentric with the vertical and horizontal pivotal axes of the bogie whereby the drive can be transmitted to the portable track in any position of the bogie relatively to the body. One arrangement of gearing is illustrated in Fig. 1, but it will be understood that the invention is not restricted to this specific arrangement since many other forms could be used. Thus, for example, if the horizontal and vertical pivotal axes are both arranged in the same vertical plane, the gearing can be considerably simplified and such an arrangement is held to lie within the scope of this invention.

Figure 4:
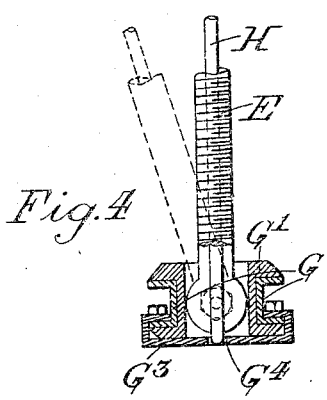
Fig. 4 is a sectional view of a detail.
Figure 5:
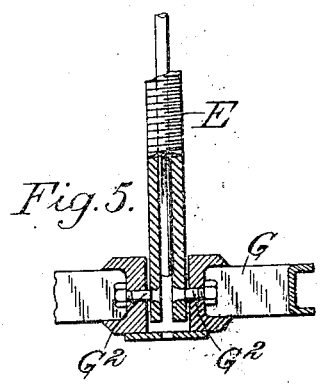
Fig. 5 is a section on the central line of Fig. 4 at right-angles to the view shown in Fig. 4.

The tilting of the bogie $C^2$ relatively to the body A is effected by any convenient mechanism. As illustrated in Figs. 1, 4 and 5, the mechanism takes the form of a screwed spindle E connected to the framework of the bogie $C^2$ and projecting upward into the body of the vehicle. A nut, screwed on this spindle, is suitably supported in the body and the nut is provided with a crown-wheel $E^1$ meshing with a bevel-wheel $E^2$ to be driven by it. The pinion $E^2$ may be driven by hand but it is preferred to provide clutch-mechanism and transmission gearing whereby it may be driven by the engine for the vehicle.

In order to simplify the mechanical construction, the bogie $C^2$ is arranged to be tilted about a horizontal axis only when it is in line with the body of the vehicle, and to insure this, a locking-pin F is provided in the body of the vehicle to engage the steering quadrant $C^4$ and hold it in its central position when the bogie is to be tilted. With this arrangement, the screwed spindle E is only swung in one vertical plane longitudinally of the vehicle, and by mounting the pinion $E^2$ to engage the crown wheel $E^1$ on a diameter at right-angles to this plane, the wheels will always remain in mesh, although the wheel $E^1$ be tilted as shown in Fig. 1. The nut on the spindle E is mounted on the body so that it is capable of a certain amount of rotation about a horizontal axis, and this axis is preferably concentric with the axis of the wheel $E^2$.

The connection of the spindle E with the bogie $C^2$ is illustrated in Figs. 4 and 5. Two channel members G are mounted on the bogie $C^2$ and curved about the vertical axis of rotation of the bogie relatively to the body. These members constitute the guide for a cross-head $G^1$ mounted on them, as shown in Fig. 4, and the spindle E is forked at its lower end and formed to engage pins $G^2$ secured in the cross-head. These pins $G^2$ do not extend across the central part of the spindle E, for the purpose hereinafter described. As will be seen from Fig. 4, this mounting provides a certain amount of freedom for the spindle E to be inclined to the cross-head $G^1$, such inclination occurring when the bogie $C^2$ is tilted down as illustrated in Fig. 1 of the drawings.

The screwed spindle E can only be guided at its upper end, and when the bogie $C^2$ is tilted downward through a considerable angle, there is a possibility that the cross-head $G^1$ may slide laterally in its guides G. According to another feature of this invention, therefore, locking means are provided for holding the cross-head $G^1$ from movement in its guide G. Referring particularly to Fig. 4, the spindle E is made hollow and the pin H extends through it. A plate $G^3$ is secured on the members G and extends across the space between them on the underside. This plate is perforated as at $G^4$, and the pin H, when advanced through the spindle E, enters the perforation $G^4$. The cross-head $G^1$ is thus effectually locked against movement along the guide G. The pin H extends up into the body of the vehicle and any convenient mechanism may be used for imparting to it the slight endwise movement that is necessary to engage it with, or disengage it from, the plate $G^3$. The perforation $G^4$ is of elongated or oval shape to provide for the tilting of the spindle E and pin H as indicated in Fig. 4.

It will be appreciated that it is not necessary that the bogie $C^2$ should always be set straight ahead when it is tilted, since the plate $G^3$ may be extended along the guide G to any desired extent and provided with a plurality of perforations corresponding to $G^4$ so that the cross-head $G^1$ can be locked in any position. As a rule, however, in practice it will be found that it will be suitable if the bogie is tilted only in the manner indicated.

As above stated, the body A of the vehicle is made watertight as to its lower parts, and of such buoyancy that the whole vehicle can float. A propeller J is mounted at the rear end of the body A and is provided with suitable clutch-means whereby it can be connected to the engine for the purpose of propelling the vehicle when afloat. The propeller-shaft $J^1$ is hinged as at $J^2$ so that the propeller can be folded up as shown in Fig. 1, to lie against the rear end of the vehicle when it is not in use.

The engine, or engines, in the vehicle are situated at the rear end, and, as illustrated in Fig. 3, the body is provided with doors $A^1$ $A^2$ at this end. The radiators for the engine are mounted opposite these doors and suitable fans are provided for forcing a current of air through the radiators and out at the back of the vehicle. Ventilation of the vehicle is thus provided for simultaneously with the cooling of the radiators. The doors at the back of the vehicle are preferably made in two parts so that when the vehicle is afloat only the lower part A² of the doors need be closed. The ventilation of the vehicle and cooling of the radiators need not then be entirely stopped by the closing of all the doors.

According to another feature of the invention, the dimensions and arrangement of the front bogie are such that the track D projects beyond the front of the body as shown in Figs. 1 and 2. This arrangement is used in order that when the vehicle is approaching a steep bank, there shall be no possibility of the body engaging the bank before the track gets on to it to effect the drive. This is very liable to occur if the portable track is set back under the front of the body as is ordinarily the case with vehicles driven by portable tracks. The rear tracks also may be arranged to project backward from the rear of the vehicle if so desired, for the same purpose.

When the vehicle is to be used for military purposes as an armored car, the bogie carrying the tracks is provided with suitable bullet-proof shields extending over the greater part of it, and according to another feature of the invention, an additional shield is provided for the front of the portable track or tracks, and transmission gearing. This shield is illustrated in Figs. 1 and 2. It consists of a hood-shaped shield K mounted on links K¹ on the front end of the bogie. These links are used in order that the shield may be swung up out of the way as shown in Fig. 1, when the vehicle is climbing a steep bank. These links K¹ are preferably inclined to one another so that the hood is tilted upward at the same time as it is swung back, and they are provided with a buffer or yielding control, so that when the shield is struck by a projectile, it can yield somewhat and thereby relieve the pivotal mounting of the bogie C² and other parts of some of the shock to which they would otherwise be subject. The links may comprise a cylinder containing a stiff spring and a plunger which constitutes the other end of the link. The vehicle is thereby rendered less liable to injury. This shield K can also be used for forcing a path through obstacles and according to another feature of the invention, it is provided with a conical or wedge-shaped shield K² projecting from the front for this object. According to another feature of the invention, the vehicle is provided with a wire-cutter or cutters L mounted on the front of the body of the vehicle so that barbed wire entanglements and the like can be cut through to afford a path for the vehicle. A guide is mounted in front of the bogie to direct the wires either downward so that the portable track passes over them, or upward into the wire cutters. This guide is conveniently constituted by the conical shield K² which directs any wire or like obstacle upward or downward in the manner described. Additional stays L¹, extending from the front of the vehicle toward the front of the bogie, also act as guides for the wire to direct it into the wire cutter L. It will be appreciated that the conical shield K² enables the vehicle to pass through barbed wire entanglements by forcing the stakes apart sidewise. Yet another advantage of this conical shield is that it presents an inclined surface to any projectile fired at it from the front, so that only a glancing blow can be given, thereby rendering the vehicle less liable to damage.

It will be understood that a vehicle constructed in accordance with this invention may be provided with a portable-track-carrying bogie in the front and portable tracks or wheels at the rear. The front bogie may have one or two portable tracks, as is found desirable. Also the rear end of the vehicle may be carried on a separate bogie mounted similarly to the bogie C² described above. One or more tracks may be used on the rear bogie, or on the vehicle itself as desired. Also it will be understood that the various parts of the mechanism which project through the floor of the vehicle will be inclosed in wells to prevent the entry of water when the vehicle is afloat, or any other desired arrangement may be used for maintaining the vehicle watertight to the required height. The various auxiliary details, such as the steering, the tilting of the bogie, the raising of the shield K, and the operation of the wire cutters, may be arranged to be operated by hand, but it is preferred to make them all power-operated by means of suitable clutches and transmission mechanism from the engine or engines of the vehicle.

It will be seen, therefore, that this invention provides a vehicle which can travel over rough ground or other obstacles which are impassable to the ordinary type of motor-vehicle, and, moreover, its range of action is not limited by water or rivers since it can be propelled across them while floating. When used as an armored car for military purposes, the vehicle can overcome practically all the artificial obstacles which are put in its path, in addition to the natural obstacles which it may encounter.

Various modifications may be made in the exact details of construction of the vehicle or of parts thereof without departing from the invention as set forth in the appended claims.

What I claim as my invention and desire to secure by Letters Patent is:—

1. In a self propelled vehicle, the combination of the vehicle body, supporting means therefor, a bogie pivotally connected about a vertical axis to said body, a frame pivotally connected about a horizontal axis to said bogie, an arcuate guide on said frame concentric with said vertical axis, a cross head on said guide movable longitudinally relatively thereto, extensible means operatively connecting the cross head to the body of the vehicle for increasing or decreasing the distance between these two parts at will, locking means whereby the cross head can be fixed relatively to said arcuate guide, an endless portable track mounted on said frame, a power unit in the body of the vehicle, and an operative connection between said portable track and said power unit.

2. In a self-propelled vehicle the combination of the vehicle-body, supporting means therefor, a bogie pivotally connected about a vertical axis to said body, a frame pivotally connected about a horizontal axis to said bogie, an arcuate guide on said frame concentric with said vertical axis, a cross-head on said guide movable longitudinally relatively thereto, a screwed spindle rotatively engaged with said cross-head, a rotatable nut mounted in the body of the vehicle engaging said screwed spindle, means for rotating said nut to feed the spindle therethrough, locking means whereby the cross-head can be fixed relatively to said arcuate guide, an endless portable track mounted on said frame, a power unit in the body of the vehicle and an operative connection between said portable track and said power-unit.

3. In a self-propelled vehicle the combination of the vehicle body, supporting means therefor, a bogie pivotally connected about a vertical axis to said body, a frame pivotally connected about a horizontal axis to said bogie, an arcuate guide on said frame concentric with said vertical axis, a cross-head on said guide movable longitudinally relatively thereto, a hollow screwed spindle rotatively engaged with said cross-head, a rotatable nut mounted in the body of the vehicle engaging said screwed spindle, means for rotating said nut to feed the spindle therethrough, a perforated plate extending lengthwise of said arcuate guide and secured on the lower side thereof, a pin mounted within said screwed spindle and movable longitudinally thereof into and out from engagement with said perforated plate, an endless portable track mounted on said frame, an internal combustion engine within the body of the vehicle, and an operative connection between said portable track and said engine.

4. In a self-propelled vehicle the combination of the body of the vehicle, a frame pivotally connected thereto about a horizontal axis transverse to the length of the body, said frame extending beyond an end of the body, a shield mounted on said frame adjustable to protect the end thereof or to be raised above the end thereof, means for tilting said frame relatively to the body, an endless portable track mounted on said frame, a power-unit on the vehicle, and an operative connection between said portable track and said power-unit.

5. In a self-propelled vehicle the combination of the body of the vehicle, a frame pivotally connected thereto about a horizontal axis transverse to the length of the body, said frame extending beyond an end of the body, a conical shield mounted on said frame adjustable to protect the end thereof or to be raised above the end thereof, means for tilting said frame relatively to the body, an endless portable track mounted on said frame, a power-unit on the vehicle and an operative connection between said portable track and said power-unit.

6. In a self-propelled vehicle the combination of the body of the vehicle, a frame pivotally connected thereto about a horizontal axis transverse to the length of the body, said frame extending beyond an end of the body, a yieldingly mounted conical shield mounted on said frame adjustable to protect the end thereof or to be raised above the end thereof, means for tilting said frame relatively to the body, an endless portable track mounted on said frame, a power-unit on the vehicle, and an operative connection between said portable track and said power-unit.

In testimony whereof I affix my signature.

ROBERT FRANCIS MACFIE.